(12) United States Patent
Buzak et al.

(10) Patent No.: US 6,479,945 B2
(45) Date of Patent: Nov. 12, 2002

(54) PLASMA ADDRESSED LIQUID CRYSTAL DISPLAY DEVICE

(75) Inventors: Thomas S. Buzak, Beaverton, OR (US); Kevin J. Ilcisin, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/920,027

(22) Filed: Aug. 1, 2001

(65) Prior Publication Data

US 2002/0047570 A1 Apr. 25, 2002

Related U.S. Application Data

(60) Provisional application No. 60/224,040, filed on Aug. 9, 2000.

(51) Int. Cl.[7] .................................................. H01J 1/88
(52) U.S. Cl. ............................... 315/169.4; 315/169.3; 313/495; 313/582
(58) Field of Search ................................. 313/495, 582, 313/583, 584, 586, 570, 572, 573; 315/169.1, 169.3, 169.4, 112, 118

(56) References Cited

U.S. PATENT DOCUMENTS

| | | | | |
|---|---|---|---|---|
| 5,705,886 A | * | 1/1998 | Bongaerts et al. | 313/483 |
| 5,764,001 A | * | 6/1998 | Khan et al. | 313/582 |
| 5,838,398 A | * | 11/1998 | Hcisin et al. | 349/32 |
| 6,153,979 A | * | 11/2000 | Hcisin et al. | 315/169.4 |
| 6,320,318 B1 | * | 11/2001 | Van Slooten et al. | 315/94 |
| 6,411,030 B1 | * | 6/2002 | Van Leeuwen et al. | 313/582 |

* cited by examiner

Primary Examiner—Tho Phan
(74) Attorney, Agent, or Firm—John D. Winkelman; John Smith-Hill

(57) ABSTRACT

A PALC panel which includes a layer of insulating material over the plasma electrodes and in which the cover sheet is spaced from the layer of insulating material at a distance of less than about 50 $\mu$m.

16 Claims, 4 Drawing Sheets

PLASMA ADDRESSED LIQUID CRYSTAL DISPLAY DEVICE

CROSS REFERENCED TO RELATED APPLICATIONS

This application claims the benefit of U.S. Provisional Application No. 60/224,040, filed Aug. 9, 2000.

BACKGROUND OF THE INVENTION

This invention relates to a plasma addressed liquid crystal (PALC) device.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a lower substrate 4, ribs 6, a cover sheet 8 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The ribs 6 define multiple parallel channels 20 between the lower substrate and the cover sheet. The channels 20 are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material rotates the plane of polarization of linearly polarized light passing therethrough by an angle which is a function of the electric field in the electro-optic material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the electro-optic material toward the upper polarizer 16 and a viewer 32. If the panel element is off, the plane of polarization of linearly polarized light passing through the volume element of electro-optic material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of electro-optic material. The plane of polarization of light incident on the upper polarizer element is at 0° and therefore the light is blocked by the upper polarizer element and the pixel is dark. If the electric field in the volume element of electro-optic material is intermediate the values associated with the panel element being off and on, light is passed by the upper polarizer element with an intensity which depends on the electric field, allowing a gray scale to be displayed.

In one practical implementation of the PALC display panel, the nominal pitch of the channels is about 400 $\mu$m. Some references suggest that depth of the channel of a PALC device must be at least about 0.75 of the channel width. Other references suggest that the depth of the channel must be at least about 0.75 of the electrode spacing. Regardless of whether the minimum depth of the channel is determined by the channel width or the electrode spacing, all references agree that in the case of a panel in which the channels are at a pitch of 400 $\mu$m the depth of the channel is well over 100 $\mu$m.

The ribs may be formed by a thick film screen printing process. The maximum thickness of material that can be deposited in a single pass of a conventional thick film screen printing process is about 10–20 $\mu$m which implies-that in the case of the channels having a depth of over 100 $\mu$m the ribs must be built up over at least five and as many as ten passes of the printing process. This is time consuming and may give rise to difficulty with respect to registration of the printing screen on successive passes of the printing process.

A discharge that is initiated in an ionizable gas between two electrodes that are both exposed to the gas is known as a DC discharge. The conventional display panel shown in FIG. 1 employs a DC discharge. A discharge can be initiated in an ionizable gas even if at least one of the electrodes is electrically insulated from the ionizable gas. Such a discharge is known as an AC discharge. A PALC device that employs an AC discharge is referred to as an AC PALC device.

SUMMARY OF THE INVENTION

It has been found that an AC PALC device can be operated with channels that are much shallower than indicated by the constraint that the depth of the channel be at least 0.75 of the channel width or electrode spacing. In particular, an AC PALC device having a channel pitch greater than 400 $\mu$m has been operated with a channel depth of only 30 $\mu$m.

In accordance with a first aspect of the invention there has been provided a PALC panel comprising a substrate, at least two plasma electrodes on an upper surface of the substrate, a layer of insulating material over the plasma electrodes, a cover sheet spaced from the layer of insulating material, ionizable gas between the cover sheet and the layer of insulating material, an array of data drive electrodes, and a layer of electro-optic material between the data drive electrodes and the cover sheet, and wherein the cover sheet is spaced from the layer of insulating material at a distance of less than about 50 $\mu$m.

In accordance with a second aspect of the invention there has been provided a PALC panel comprising a substrate, at least two plasma electrodes on an upper surface of the substrate at a spacing S, a layer of insulating material over the plasma electrodes, a cover sheet spaced from the layer of insulating material at a distance D, ionizable gas between the cover sheet and the layer of insulating material, an array of data drive electrodes, and a layer of electro-optic material between the data drive electrodes and the cover sheet, and wherein D is substantially less than 0.75 S.

In accordance with a third aspect of the invention there has been provided a PALC panel comprising a substrate, at least two ribs on an upper surface of the substrate defining a channel of width W, at least two plasma electrodes on the upper surface of the substrate, the plasma electrodes being between the ribs, a layer of insulating material over the plasma electrodes, a cover sheet spaced from the layer of insulating material at a distance D, ionizable gas between the cover sheet and the layer of insulating material, an array of data drive electrodes, and a layer of electro-optic material between the data drive electrodes and the cover sheet, and wherein D is substantially less than 0.75 W.

BRIEF DESCRIPTION OF THE DRAWINGS

For a better understanding of the invention, and to show how the same may be carried into effect, reference will now be made by way of example, to the accompanying drawings, in which.

In the several figures of the drawings, like reference numerals designate like or corresponding components.

In this specification, words of orientation and position, such as upper and lower, are used to establish orientation and position relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1:
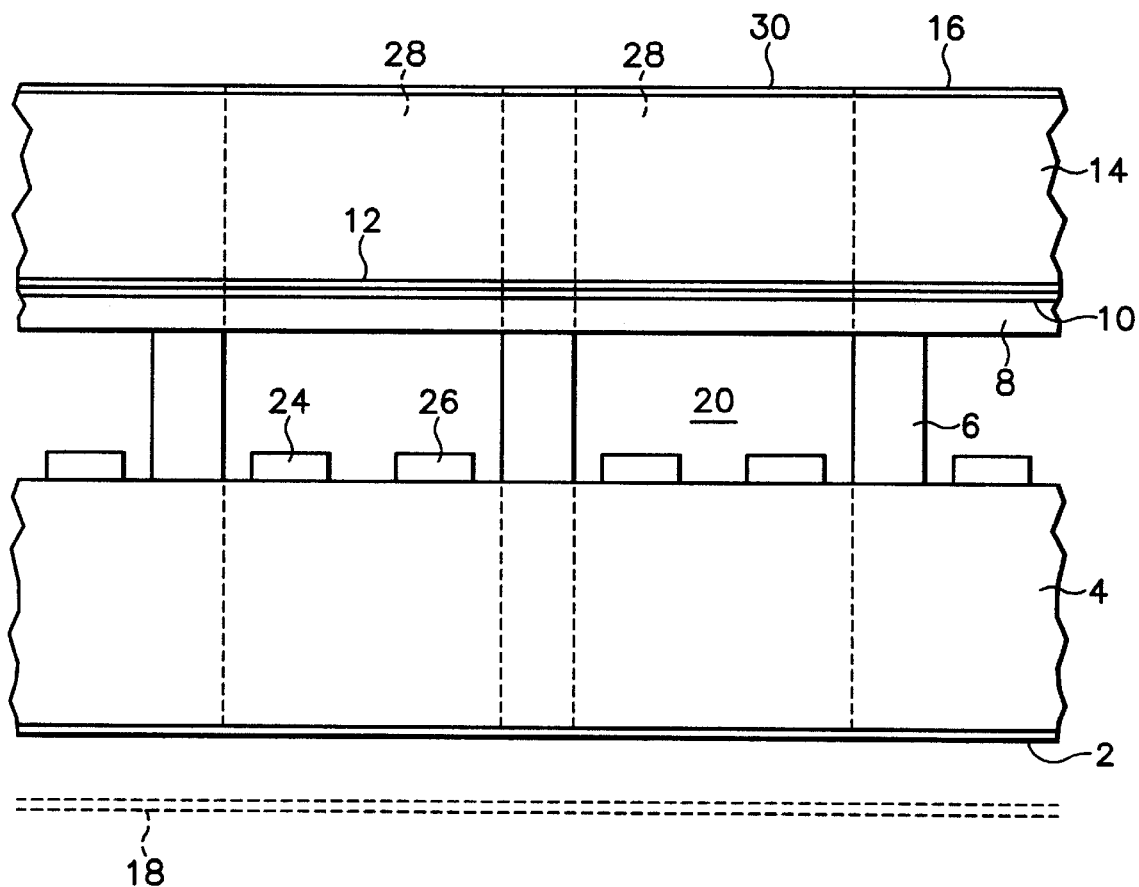
FIG. 1 is a partial sectional view of a PALC display panel in accordance with the prior art.
Figure 2:
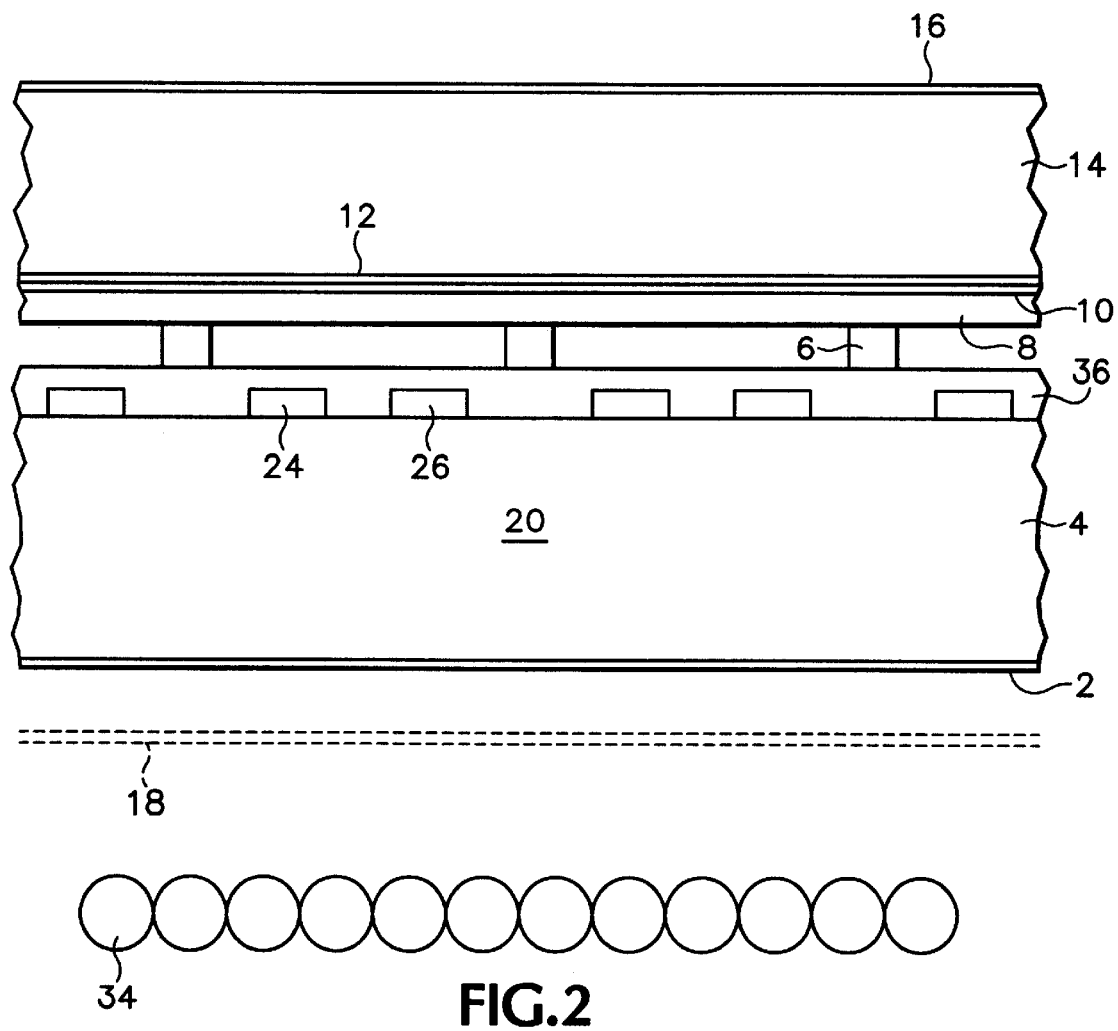
FIG. 2 is a partial sectional view of a first PALC panel in accordance with the present invention.

The PALC panel shown in FIG. 2 includes a blanket layer 36 of a screen printable dielectric material over the plasma electrodes 24, 26 and the ribs 6 are formed over the dielectric layer by thick film screen printing. The screen printable dielectric may be, for example, glass that has been deposited as a frit and then fused. The upper substrate assembly is positioned over the ribs and is attached to the lower substrate assembly in conventional fashion.

Since the dielectric layer 36 isolates the electrodes 24, 26 from the ionizable gas in the channels 20, the PALC panel shown in FIG. 2 is an AC PALC device. As noted above, in an AC PALC device, the channel depth can be as small as 30 $\mu$m. Consequently, the ribs can be formed in as few as two passes of the screen printing process.

The signal waveforms used for driving an AC PALC panel having shallow channels, as described above, are similar to those used for conventional AC PALC panels and accordingly the improved AC PALC panel can be operated without need for special drive electronics or other system hardware.

Figure 3:
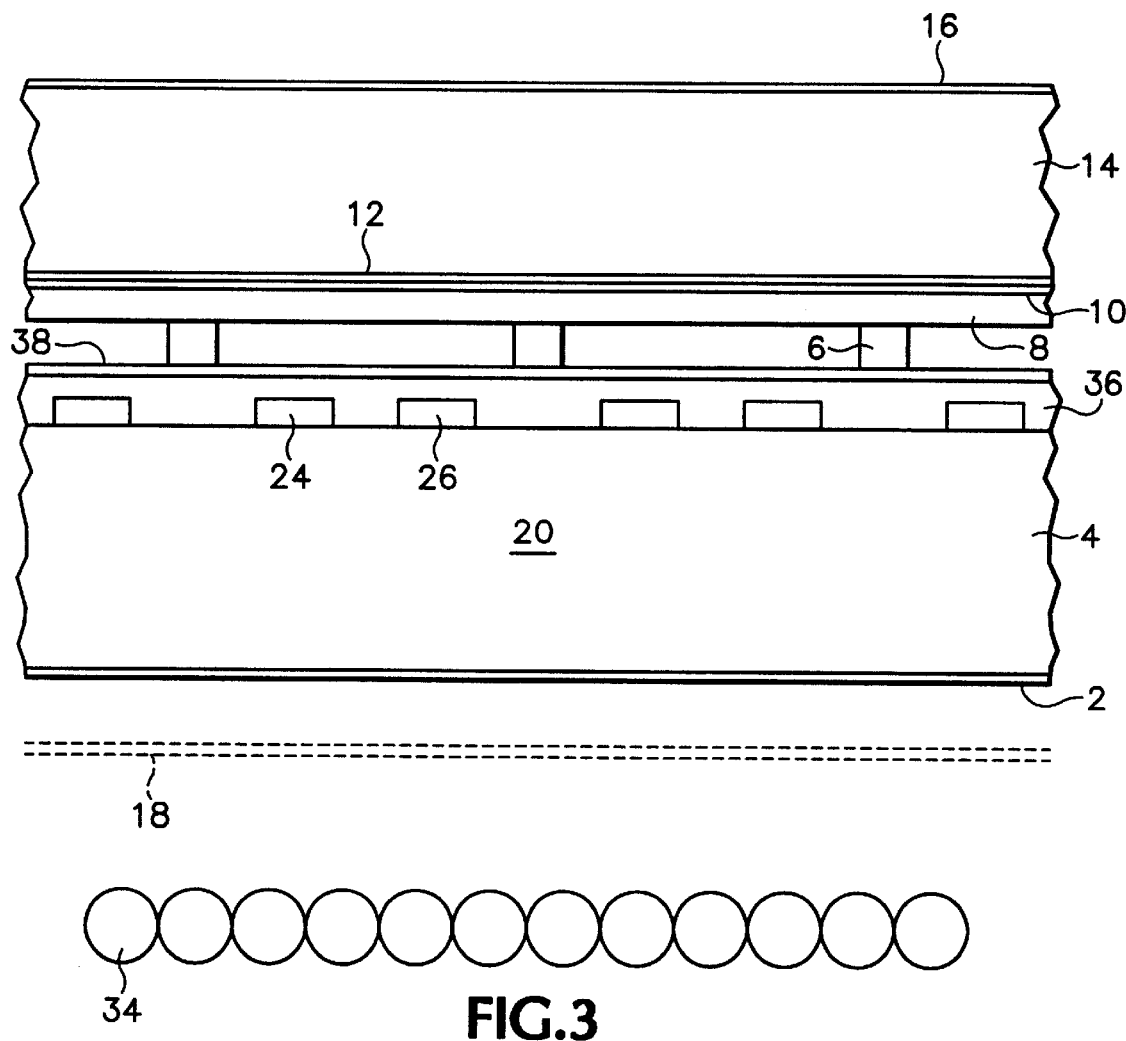
FIG. 3 is a partial sectional view of a second PALC panel in accordance with the present invention.

FIG. 3 illustrates a first modification of the structure described with reference to FIG. 2. In accordance with FIG. 3, a layer 38 of a material having a high coefficient of secondary emission is deposited over the dielectric layer 36 before the ribs are deposited in order to reduce the potential required to initiate the AC discharge. Magnesium oxide is a favorable choice for this purpose because it is transparent and does not impair the transmissivity of the panel.

Figure 4:
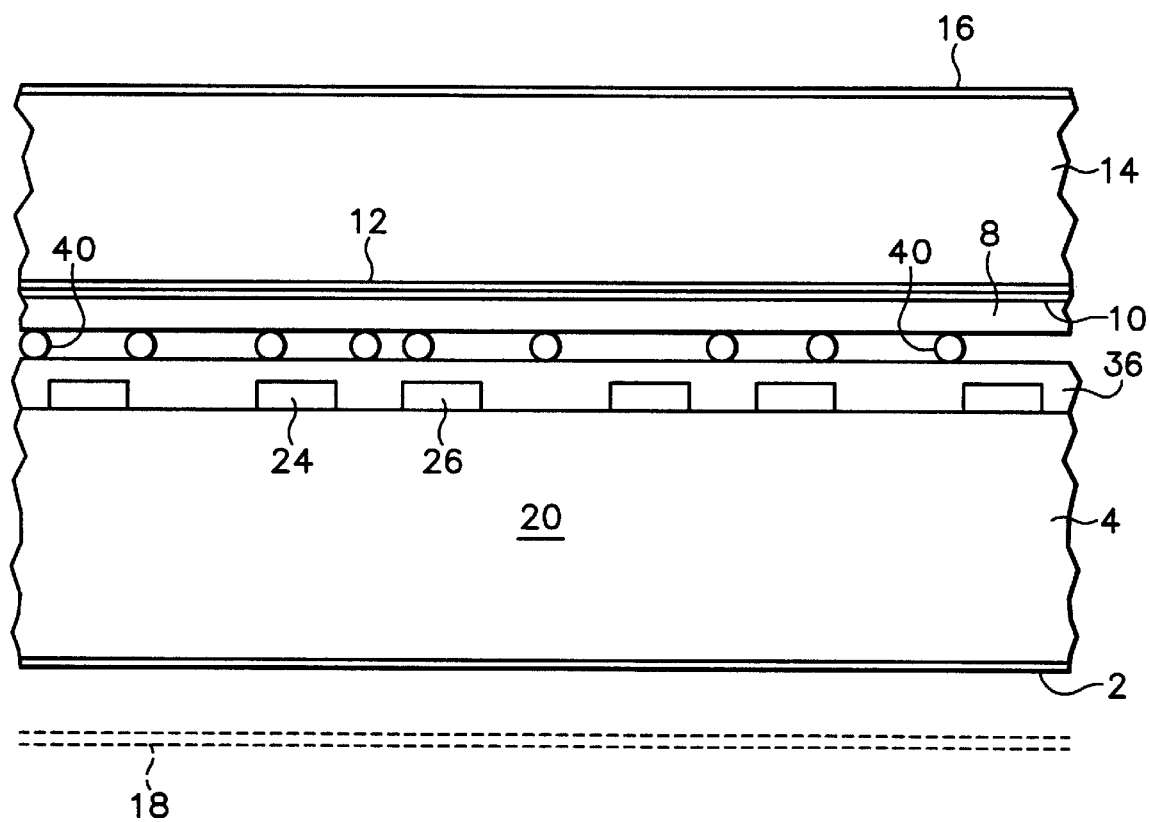
FIG. 4 is a partial sectional view of a third PALC panel in accordance with the present invention.

Although the discovery that an AC PALC panel can be operated with channels that are much shallower than 0.75 of the channel width or electrode spacing is particularly advantageous with respect to a structure in which the ribs are formed by a thick film screen printing process, the invention is not restricted to use of ribs attached to the dielectric layer for holding the cover sheet spaced from the dielectric layer. FIG. 4 illustrates a second modification of the structure described with reference to FIG. 2. In accordance with FIG. 4, the cover sheet is held spaced from the dielectric layer 36 by glass balls 40. Because the spacing between the cover sheet and the layer of dielectric material is small, the balls are sufficiently small that they do not interfere with formation of the plasma and therefore the balls need not be at defined locations relative to the electrodes 24, 26 but may be distributed essentially at random over the upper surface of the dielectric layer 36. Another possibility is to employ fibers as spacers between the lower substrate assembly and the upper substrate assembly. The fibers would be placed at the locations normally occupied by the ribs, i.e. between one pair of plasma electrodes 24, 26 and an adjacent pair of plasma electrodes.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A PALC panel comprising:
   a substrate,
   at least two plasma electrodes on an upper surface of the substrate,
   a layer of insulating material over the plasma electrodes,
   a cover sheet spaced from the layer of insulating material,
   ionizable gas between the cover sheet and the layer of insulating material,
   an array of data drive electrodes, and
   a layer of electro-optic material between the data drive electrodes and the cover sheet,
   and wherein the cover sheet is spaced from the layer of insulating material at a distance of less than about 50 $\mu$m.

2. A PALC panel according to claim 1, wherein the cover sheet is spaced from the layer of insulating material by ribs attached to the layer of insulating material.

3. A PALC panel according to claim 1, wherein the cover sheet is spaced from the insulating material by insulating fibers.

4. A PALC panel according to claim 1, wherein the cover sheet is spaced from the insulating material by spheres.

5. A PALC panel according to claim 1, wherein the insulating material includes a layer of electron emissive material having a free surface exposed to the ionizable gas.

6. A PALC panel according to claim 5, wherein the electron emissive material is magnesium oxide.

7. A PALC panel comprising:
a substrate,
at least two plasma electrodes on an upper surface of the substrate at a spacing S,
a layer of insulating material over the plasma electrodes,
a cover sheet spaced from the layer of insulating material at a distance D,
ionizable gas between the cover sheet and the layer of insulating material,
an array of data drive electrodes, and
a layer of electro-optic material between the data drive electrodes and the cover sheet,
and wherein D is substantially less than 0.75 S.

8. A PALC panel according to claim 7, wherein the cover sheet is spaced from the layer of insulating material by ribs attached to the layer of insulating material.

9. A PALC panel according to claim 7, wherein the cover sheet is spaced from the insulating material by insulating fibers.

10. A PALC panel according to claim 7, wherein the cover sheet is spaced from the insulating material by spheres.

11. A PALC panel according to claim 7, wherein the insulating material includes a layer of electron emissive material having a free surface exposed to the ionizable gas.

12. A PALC panel according to claim 11, wherein the electron emissive material is magnesium oxide.

13. A PALC panel comprising:
a substrate,
at least two ribs on an upper surface of the substrate defining a channel of width W,
at least two plasma electrodes on the upper surface of the substrate, the plasma electrodes being between the ribs,
a layer of insulating material over the plasma electrodes,
a cover sheet spaced from the layer of insulating material at a distance D,
ionizable gas between the cover sheet and the layer of insulating material,
an array of data drive electrodes, and
a layer of electro-optic material between the data drive electrodes and the cover sheet,
and wherein D is substantially less than 0.75 W.

14. A PALC panel according to claim 13, wherein the ribs are attached to the layer of insulating material.

15. A PALC panel according to claim 13, wherein the insulating material includes a layer of electron emissive material having a free surface exposed to the ionizable gas.

16. A PALC panel according to claim 15, wherein the electron emissive material is magnesium oxide.

* * * * *